(12) United States Patent
Shi et al.

(10) Patent No.: US 11,482,755 B2
(45) Date of Patent: Oct. 25, 2022

(54) SECONDARY BATTERY AND BATTERY PACK

(71) Applicant: Jiangsu Contemporary Amperex Technology Limited, Jiangsu (CN)

(72) Inventors: Dongyang Shi, Jiangsu (CN); Fei Hu, Jiangsu (CN); Zhenhua Li, Jiangsu (CN); Yuanbao Chen, Jiangsu (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 309 days.

(21) Appl. No.: 16/565,780

(22) Filed: Sep. 10, 2019

(65) Prior Publication Data
US 2021/0043899 A1    Feb. 11, 2021

(30) Foreign Application Priority Data

Aug. 7, 2019    (CN) .......................... 201921269232.1

(51) Int. Cl.
*H01M 50/30*    (2021.01)
*H01M 50/531*    (2021.01)
(Continued)

(52) U.S. Cl.
CPC ......... *H01M 50/30* (2021.01); *H01M 50/116* (2021.01); *H01M 50/172* (2021.01); *H01M 50/20* (2021.01); *H01M 50/531* (2021.01)

(58) Field of Classification Search
None
See application file for complete search history.

(56) References Cited

U.S. PATENT DOCUMENTS

| | | | |
|---|---|---|---|
| 2009/0017365 A1* | 1/2009 | Miyahisa | H01M 6/46 429/54 |
| 2011/0076533 A1* | 3/2011 | Choi | H01M 50/183 429/185 |

(Continued)

FOREIGN PATENT DOCUMENTS

| | | |
|---|---|---|
| CN | 102044639 A | 5/2011 |
| CN | 105591062 A | 5/2016 |

(Continued)

OTHER PUBLICATIONS

PCT International Search Report for PCT/CN2020/105164, dated Oct. 28, 2020, 9 pages.

(Continued)

*Primary Examiner* — Ula C Ruddock
*Assistant Examiner* — Kevin K Eng
(74) *Attorney, Agent, or Firm* — East IP P.C.

(57) ABSTRACT

The present disclosure relates to a secondary battery and a battery pack, and the secondary battery includes: an outer casing, comprising a case and a cap assembly connected to each other, the case is provided with an opening, the cap assembly includes a cap plate and an electrode terminal connected to the cap plate, wherein the cap plate is adapted to cover the opening; an electrode assembly accommodated in the case and including a main body and a tab extending out from the main body, wherein the tab is electrically connected to the electrode terminal; a vent connected to the outer casing; and an insulating member at least partially disposed between the electrode assembly and the vent, wherein a projection of the vent on the main body is at least partially covered by the insulating member.

9 Claims, 10 Drawing Sheets

(51) Int. Cl.
   *H01M 50/116*    (2021.01)
   *H01M 50/172*    (2021.01)
   *H01M 50/20*     (2021.01)

(56) References Cited

U.S. PATENT DOCUMENTS

2017/0149047 A1*  5/2017  Guen ................ H01M 50/553
2017/0331078 A1* 11/2017  Schneider ......... H01M 50/529
2019/0363316 A1* 11/2019  Lee .................. H01M 50/169

FOREIGN PATENT DOCUMENTS

| CN | 207690905 U  | 8/2018  |
| CN | 208189697 U  | 12/2018 |
| CN | 109698385 A  | 4/2019  |
| JP | 2014149933 A | 8/2014  |
| JP | 2016139586 A | 8/2016  |
| WO | 2018043890 A1 | 3/2018 |
| WO | 2018147603 A1 | 8/2018 |

OTHER PUBLICATIONS

The extended European search report dated Apr. 14, 2020 for European Application No. 19196062.4, 8 pages.

* cited by examiner

SECONDARY BATTERY AND BATTERY PACK

CROSS REFERENCE TO RELATED APPLICATION

This application claims priority to Chinese Patent Application No. 201921269232.1, filed on Aug. 7, 2019, which is hereby incorporated by reference in its entirety.

TECHNICAL FIELD

The present disclosure relates to a technical filed of energy storage devices, and particularly relates to a secondary battery and a battery pack.

BACKGROUND

With the wide application of new energy vehicles, people have higher and higher requirements on safety performance of secondary batteries. Currently, the secondary battery mainly includes an outer casing and an electrode assembly disposed in the outer casing. In order to ensure the safety performance of the secondary battery, a vent is usually disposed on the outer casing.

When the secondary battery is placed standing or is put down, free electrolyte inside the outer casing directly contacts with the vent. When a short circuit occurs between the electrode assembly and the outer casing, the electrode assembly and the outer casing will form a primary battery, resulting in that free lithium ions generated by the electrode assembly diffuse to the outer casing and corrode the outer casing. The vent has the thinnest wall thickness and thus will be corroded through in a short time, thereby causing leakage of the electrolyte and shortening the service life of the secondary battery.

Therefore, there is a dire need for a secondary battery and a battery pack that can prolong the time required to corrode through the vent of the secondary battery.

SUMMARY

The embodiments of the present disclosure discloses a secondary battery and a battery pack, which can extend a path length for free lithium ions inside an electrode assembly to diffuse to a vent, thereby prolonging the time required to corrode through the vent and thus prolonging a service life of the secondary battery and battery pack.

On one aspect, the embodiments of the present disclosure discloses a secondary battery, comprising: an outer casing, comprising a case and a cap assembly connected to each other, the case is provided with an opening, the cap assembly comprises a cap plate and an electrode terminal connected to the cap plate, wherein the cap plate is adapted to cover the opening; an electrode assembly accommodated in the case and comprising a main body and a tab extending out from the main body, wherein the tab is electrically connected to the electrode terminal; a vent connected to the outer casing; and an insulating member at least partially disposed between the electrode assembly and the vent, wherein a projection of the vent on the main body is at least partially covered by the insulating member.

According to one aspect of the embodiments of the present disclosure, the main body has a first surface facing the vent, and the insulating member comprises a main cover body covering at least a portion of the first surface.

According to one aspect of the embodiments of the present disclosure, the vent is disposed on the cap plate, and the electrode assembly comprises two tabs, each of which extends from the first surface toward the cap plate.

According to one aspect of the embodiments of the present disclosure, the main cover body comprises a first cover member and a second cover member; the first surface has a center line dividing the first surface into a first region and a second region disposed opposite to each other in a thickness direction of the electrode assembly, and the two tabs are disposed in the first region and are bent toward the second region in the thickness direction, wherein the first cover member is adapted to at least cover the second region, and the second cover member is adapted to at least cover the first region.

According to one aspect of the embodiments of the present disclosure, the first cover member and the second cover member are adapted to at least partially overlap in a height direction of the electrode assembly.

According to one aspect of the embodiments of the present disclosure, the secondary battery further comprises connecting pieces, and two connecting pieces in pairs are located between the cap plate and the electrode assembly, wherein each of the connecting pieces comprises a terminal connection portion connected to the electrode terminal and a tab connection portion connected to the tab; and the second cover member is further adapted to cover a surface of the tab connection portion facing the cap plate, and a portion of the second cover member located between the two connecting pieces in a length direction of the electrode assembly is connected to the first cover member.

According to one aspect of the embodiments of the present disclosure, the tab comprises a fixing portion extending in the thickness direction and fixedly connected to the tab connection portion, and a bent portion connected between the fixing portion and the main body and bent relative to the fixing portion, wherein the first cover member comprises a first support portion, a second support portion and a third support portion; and in the height direction, the first support portion is disposed opposite to the fixing portion and adapted to cover a surface of the fixing portion facing away from the cap plate, and is stacked and connected to the second cover member, the second support portion is adapted to cover the second region, and the third support portion is connected between the first support portion and the second support portion and adapted to cover a side of the bent portion close to the second region.

According to one aspect of the embodiments of the present disclosure, the insulating member further comprises a side connecting body, wherein the main cover body is connected with the side connecting body on at least one side in the thickness direction, and the side connecting body is attached to a surface of the electrode assembly in the thickness direction.

According to one aspect of the embodiments of the present disclosure, the main cover body is provided with one side connecting body on each side in the thickness direction, and one of the side connecting bodies is integrally formed with the first cover member, and the other of the side connecting bodies is integrally formed with the second cover member.

According to one aspect of the embodiments of the present disclosure, the secondary battery comprises a plurality of electrode assemblies, which are arranged in pairs and stacked in the thickness direction, wherein each of the electrode assemblies is disposed corresponding to one main cover body, and the second regions of the two electrode assemblies of the same pair are disposed adjacent to each other.

According to one aspect of the embodiments of the present disclosure, the case comprises a bottom plate which is disposed opposite to the cap plate and a sidewall which surrounds the bottom plate and is connected to the bottom plate and the cap plate, wherein the opening is formed by one end of the sidewall away from the bottom plate, and the vent is disposed on the bottom plate or the sidewall.

According to one aspect of the embodiments of the present disclosure, the insulating member is formed as a flexible sheet-like member, and the insulating member is adhesively connected to the electrode assembly.

On a further aspect, the embodiments of the present disclosure disclose a battery pack, comprising: a housing having a receiving chamber; and a battery module disposed in the receiving chamber, wherein the battery module comprises a plurality of secondary batteries as described above.

In the secondary battery and battery pack according to the embodiments of the present disclosure, the secondary battery includes an outer casing, an electrode assembly, a vent, and an insulating member, and thus not only can meet the energy storage requirement, but also can release pressure by use of the vent when an internal pressure of the secondary battery is too high, thereby ensuring the safety of the secondary battery. Further, the insulating member is correspondingly provide and defined to be at least partially disposed between the electrode assembly and the vent and at least partially cover a projection of the vent on a main body of the electrode assembly. As such, when a short circuit occurs inside the electrode assembly and a primary battery is formed by the electrode assembly and the outer casing, the free lithium ions inside the electrode assembly can only diffuse along a periphery of the insulating member, while cannot directly diffuse to the vent. That is, a path for the lithium ions to diffuse from the electrode assembly to the vent is greatly extended, which can prolong the time required to corrode through the vent and cause leakage of the electrolyte, and can further prolong the service life of the secondary battery and the battery pack.

BRIEF DESCRIPTION OF THE DRAWINGS

Features, advantages, and technical effects of the exemplary embodiments of the present disclosure will be described below with reference to the drawings.

REFERENCE NUMERALS

Figure 1:
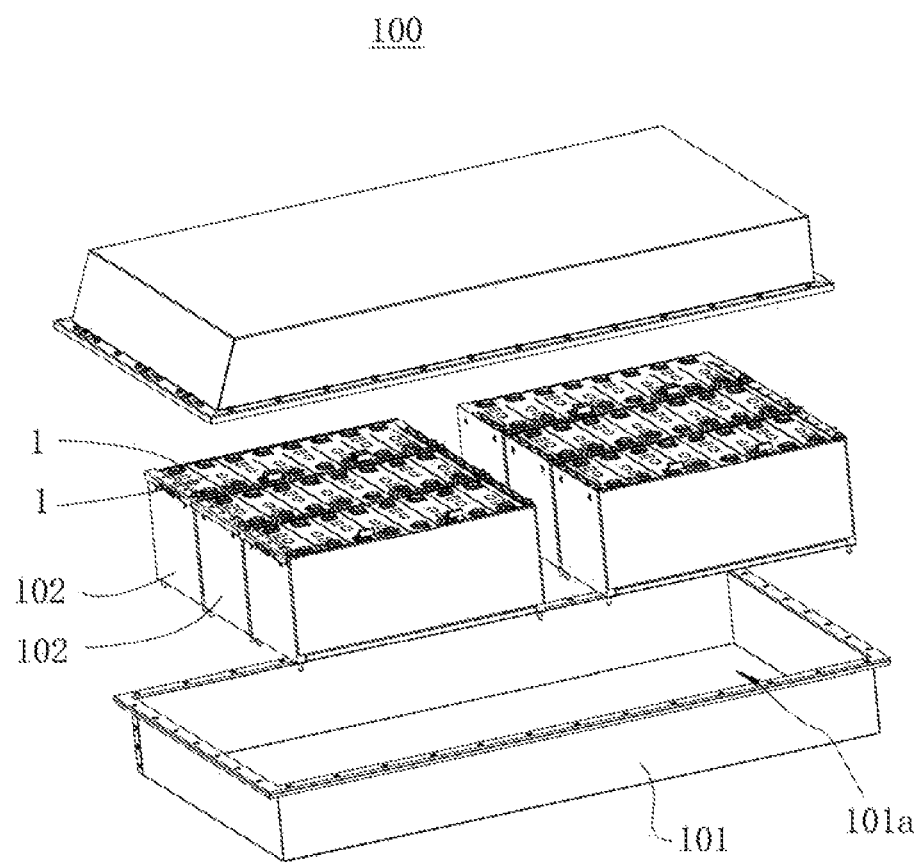
FIG. 1 shows a schematic exploded view of a battery pack according to an embodiment of the present disclosure.

1—second battery;
10—outer casing;
110—case; 111—bottom plate; 112—sidewall; 113—opening;
120—cap assembly; 121—cap plate; 122—electrode terminal;
20—electrode assembly;
210—main body; 211—first surface; 211a—first region; 211b—second region; 212—center line
220—tab; 221—fixing portion; 222—bent portion;
30—vent;
40—insulating member;
410—main cover body; 411—first cover member; 411a—first support portion;
411b—second support portion; 411c—third support portion; 412—second cover member
420—side connecting body;
430—cut member;
50—connecting piece; 510—terminal connection portion; 520—tab connection portion;
100—battery pack;
101—housing; 101a—receiving chamber;
102—battery module;
X—thickness direction; Y—length direction; Z—height direction.

In the drawings, the same components are denoted by the same reference numerals. The drawings are not drawn to scale.

DETAILED DESCRIPTION

Features and exemplary embodiments of various aspects of the present disclosure will be described in detail below. In the following detailed description, numerous specific details are set forth to provide a full understanding of the present disclosure. However, it shall be apparent to the person skilled in the art that the present disclosure may be implemented without some of the details. The following description of the embodiments is made merely to provide a better understanding of the present disclosure by showing examples of the present disclosure. In the figures and the following description, at least some of well-known structures and techniques are not shown to avoid unnecessarily obscuring the present disclosure. Further, for clarity, size of part of the structure may be exaggerated. Furthermore, features, structures, or characteristics described hereinafter may be combined in any suitable manner into one or more embodiments.

Orientations in the following description refer to directions as shown in the figures, and are not intended to limit specific structure of the secondary battery and battery pack of the present disclosure. In the description of the present disclosure, it shall be noted that, unless otherwise clearly stated and defined, the terms such as "installation", "connection" shall be understood broadly, and may be, for example, a fixed connection, a disassemble connection, or an integral connection, and may be a direct connection or an indirect connection through an intermediate medium. The specific meaning of the above terms in the present disclosure can be understood by the person skilled in the art according to actual circumstance.

In order to better understand the present disclosure, a secondary battery and a battery pack according to an embodiment of the present disclosure will be described in detail below with reference to FIGS. 1-14.

Referring to FIG. 1, FIG. 1 shows a schematic exploded view of a battery pack according to an embodiment of the present disclosure. The embodiment of the present disclosure discloses a battery pack 100, which includes a housing 101 and a battery module 102. The housing 101 has a receiving chamber 101a, and the battery module 102 is disposed in the receiving chamber 101a. There may be one battery module 102. Of course, there may be two or more battery modules 102. The number of the battery modules 102 may be set according to an energy storage requirement, and each of the battery modules 102 includes a plurality of secondary batteries 1.

In order to better ensure a service life of the battery pack 100, an embodiment of the present disclosure further discloses a novel secondary battery 1, which has higher safety and longer service life. This secondary battery 1 can be produced and sold as an independent component, and of course, can be applied to the battery pack 100 of the above embodiment as a component. For a better understanding, the secondary battery 1 according to the embodiment of the present disclosure will be described in detail below with reference to FIGS. 2 to 14.

Figure 2:
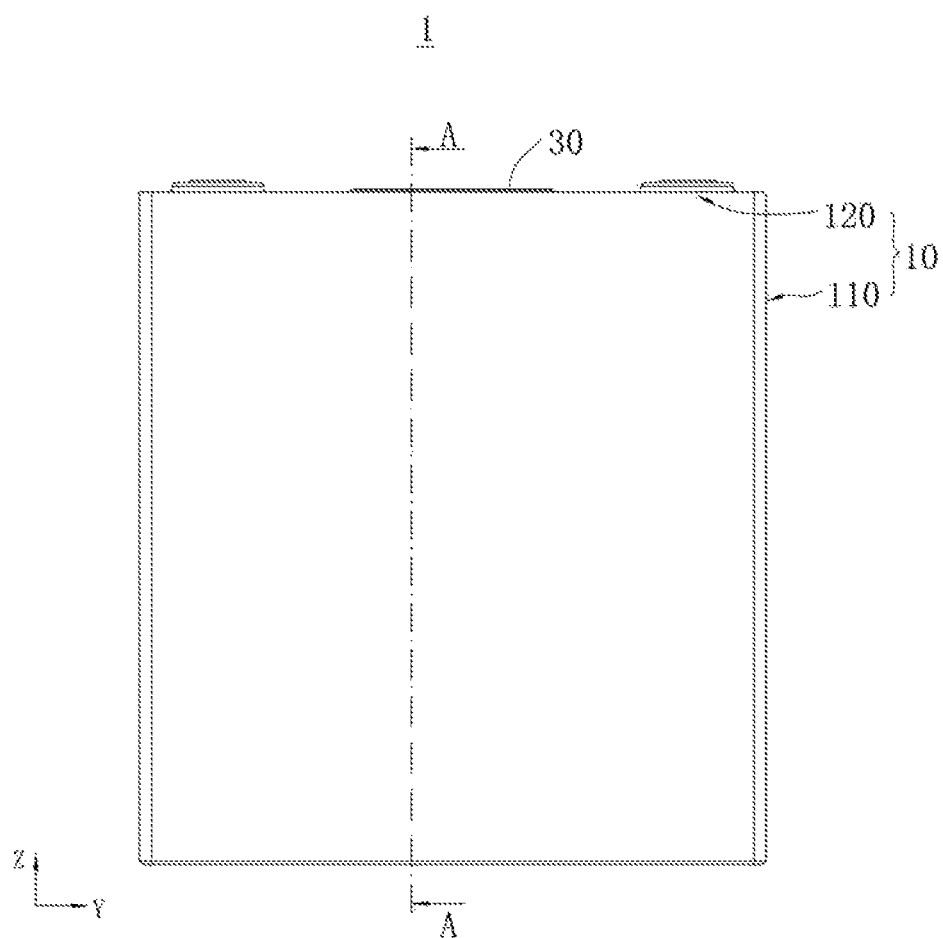
FIG. 2 shows a schematic view of a configuration of a secondary battery according to an embodiment of the present disclosure.
Figure 3:
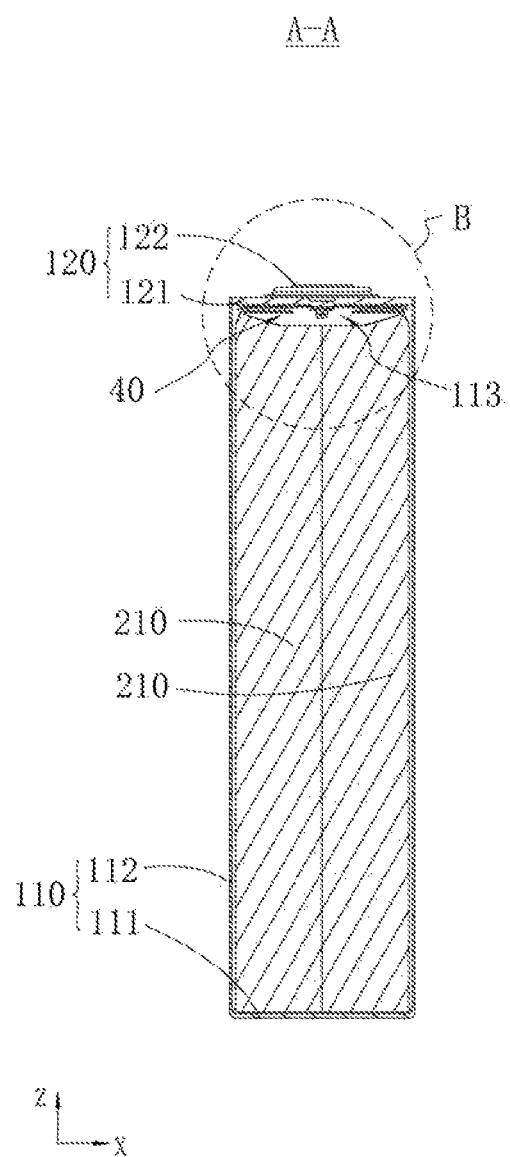
FIG. 3 shows a cross-sectional view taken along line A-A of FIG. 2.
Figure 4:
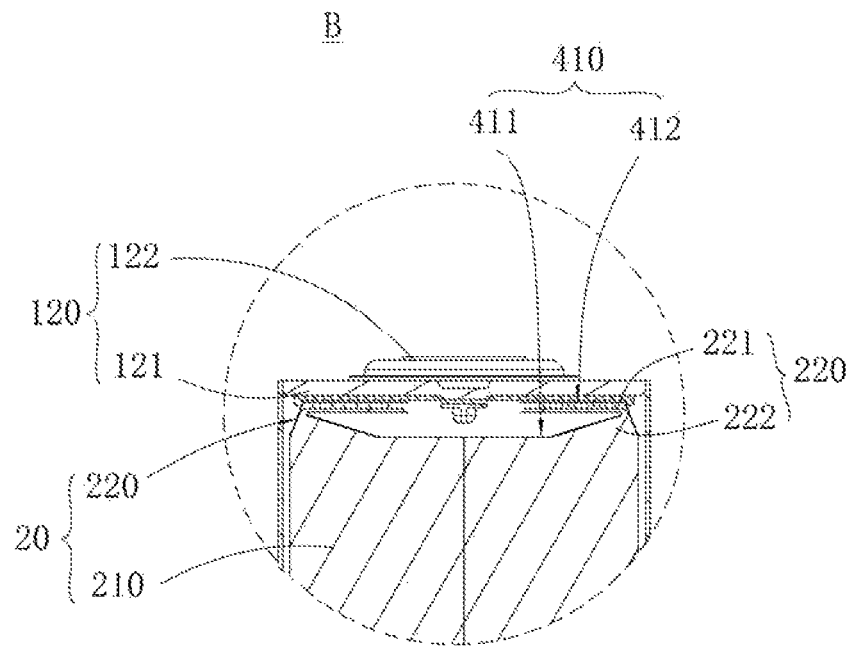
FIG. 4 is an enlarged view of the portion B in FIG. 3.
Figure 5:
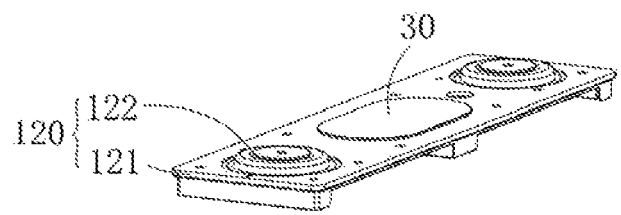
FIG. 5 shows a schematic view of a configuration of a cap assembly according to an embodiment of the present disclosure.
Figure 6:
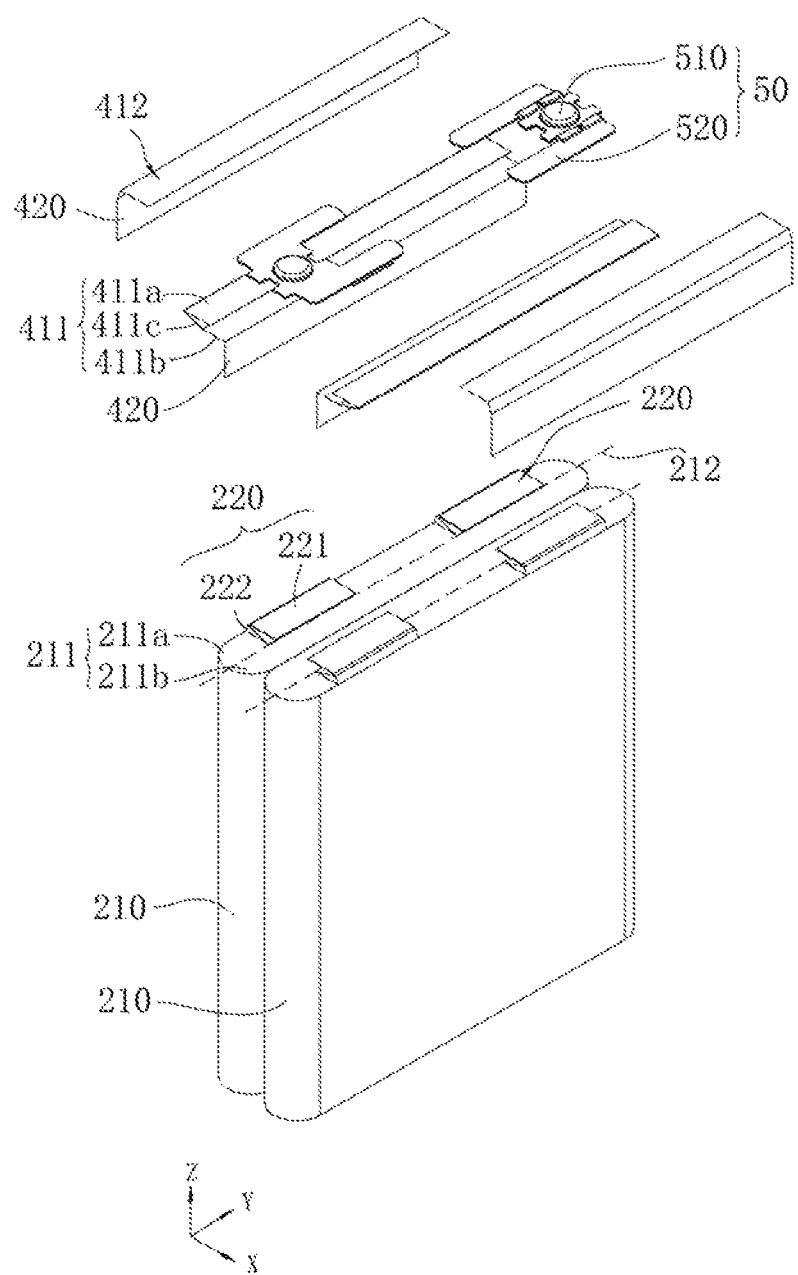
FIG. 6 shows a partial exploded view of a configuration of a secondary battery according to an embodiment of the present disclosure.

Please refer to FIG. 2 to FIG. 6. FIG. 2 shows a schematic diagram of a configuration of a secondary battery according to an embodiment of the present disclosure, FIG. 3 shows a cross-sectional view taken along line A-A of FIG. 2, FIG. 4 shows an enlarge view of the portion B in FIG. 3, FIG. 5 shows a schematic diagram of a configuration of a cap assembly according to an embodiment of the present disclosure, and FIG. 6 shows a partial exploded view of a configuration of a secondary battery according to an embodiment of the present disclosure.

According to an embodiment of the present disclosure, the secondary battery 1 includes an outer casing 10, an electrode assembly 20, a vent 30, and an insulating member 40.

The outer casing 10 includes a case 110 and a cap assembly 120 connected to each other. The case 110 has an opening 113. The cap assembly 120 includes a cap plate 121 and an electrode terminal 122 connected to the cap plate 121, and the cap plate 121 covers the opening 113. The electrode assembly 20 is accommodated in the case 110 and includes a main body 210 and a tab 220 extending out from the main body 210. The tab 220 is electrically connected to the electrode terminal 122, and the vent 30 is connected to the outer casing 10. The insulating member 40 is at least partially disposed between the electrode assembly 20 and the vent 30, wherein a projection of the vent 30 on the main body 210 is at least partially covered by the insulating member 40. Alternatively, said projection may refer to a projection of the vent 30 on a surface of the main body 210 facing the vent 30.

In the secondary battery 1 according to the embodiment of the present disclosure, when a short circuit occurs inside the electrode assembly 20, the insulating member 40 can extend a path length for free lithium ions inside the electrode assembly 20 to diffuse to the vent 30, thereby prolonging the time required to corrode through the vent 30 and thus prolonging the service life of the secondary battery 1.

As an alternative embodiment, the case 110 includes a bottom plate 111 disposed opposite to the cap plate 121 and a sidewall 112 surrounding the bottom plate 111 and connected to the bottom plate 111 and the cap plate 121. The opening 113 is formed by an end of the sidewall 112 away from the bottom plate 111.

The cap assembly 120 as a whole is connected to the case 110, and the cap plate 121 of the cap assembly 120 is located at the opening 113 and seals the opening 113. The bottom plate 111, the cap plate 121, and the sidewall 112 together form an accommodation space for accommodating the electrode assembly 20.

The electrode assembly 20 is disposed in the accommodation space, and the main body 210 of the electrode assembly 20 may be formed by stacking or winding the first electrode plate, a second electrode plate and a separator together, wherein the separator is an insulator interposed between the first electrode plate and the second electrode plate, wherein the tab 220 is electrically connected to the main body 210.

In some optional examples, there may be a plurality of electrode assemblies 20, which are arranged in pairs and stacked in a thickness direction X. To better understand the secondary battery 1 according to an embodiment of the present disclosure, the description is made by exemplarily taking the number of the electrode assemblies 20 as two. The two electrode assemblies 20 are stacked in the thickness direction X.

Alternatively, the insulating member 40 may be connected to the electrode assembly 20, and may, of course, be connected to the cap plate 121 or the case 110. The specific configuration of the insulating member 40 may be adjusted according to a position of the vent 30, as long as the path length for the free lithium ions inside the electrode assembly 20 to diffuse to the vent 30 can be extended and thus the time required to corrode through the vent 30 can be prolonged.

In some optional examples, the insulating member 40 may be formed as a flexible sheet-like member, and is adhesively connected to the electrode assembly 20. By the above-mentioned configuration, the insulating member 40 can not only extend the path length for the free lithium ions to diffuse to the vent 30, but also has a simple structure and is easy to be connected with the electrode assembly 20. Also, the insulating member 40 has a light weight and thus does not affect an energy density of the secondary battery 1.

As an alternative embodiment, the main body 210 of each electrode assembly 20 has a first surface 211 facing the vent 30, and the insulating member 40 includes a main cover body 410, which covers at least a portion of the first surface 211. Since the main body 210 of the electrode assembly 20 generates relatively more free lithium ions when a short circuit occurs, by disposing the main cover body 410 on the first surface 211 of the main body 210 facing the vent 30, when the short circuit occurs inside the electrode assembly 20, the path length for most of the free lithium ions can be extended. Also, the structure of the insulating member 40 can be made simple, and thus the insulating member 40 is easy to be mounted in the secondary battery 1.

Alternatively, the vent 30 may be disposed at different positions of the outer casing 10. In some optional examples, the vent 30 may be disposed on the cap plate 121. In this case, the first surface 211 may be a surface of the main body 210 facing the cap plate 121. The configuration of the main cover body 410 can be set according to a position of the tab 220.

In some optional examples, the electrode assembly 20 includes two tabs 220, each of which extends from the first surface 211 toward the cap plate 121. In some optional examples, each tab 220 is located between the electrode assembly 20 and the cap plate 121. In this case, the configuration of the main cover body 410 may be adjusted according to the position of the tab 220 on the first surface 211.

Figure 7:
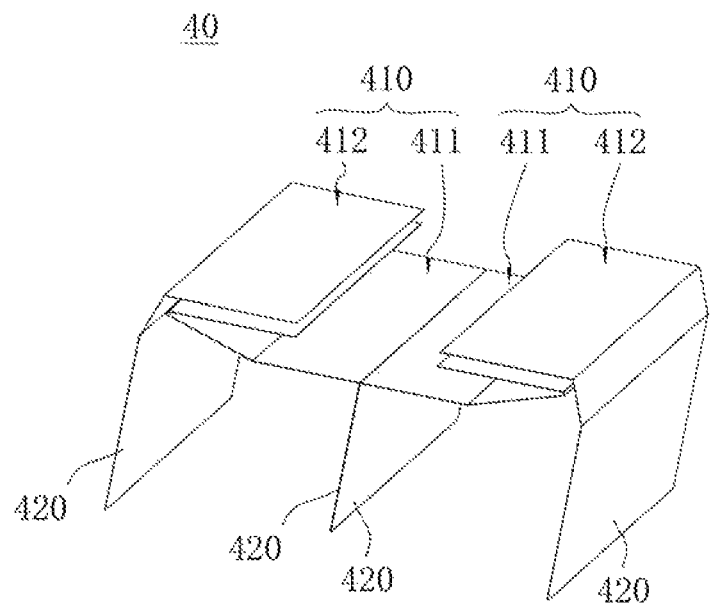
FIG. 7 shows a schematic view of a configuration of an insulating member according to an embodiment of the present disclosure.
Figure 8:
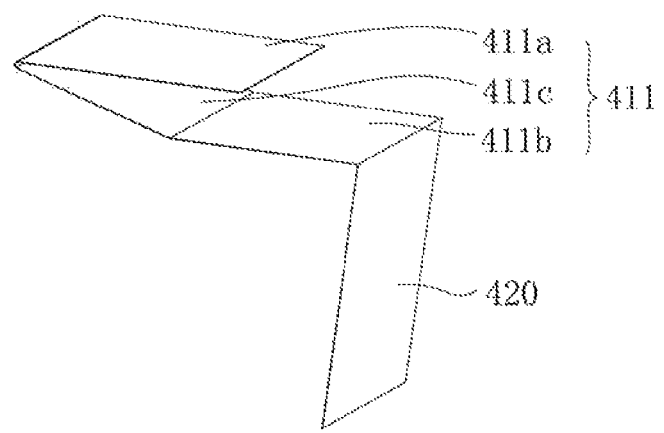
FIG. 8 shows a schematic view of a configuration of a first cover member matching with a side connecting body according to an embodiment of the present disclosure.
Figure 9:
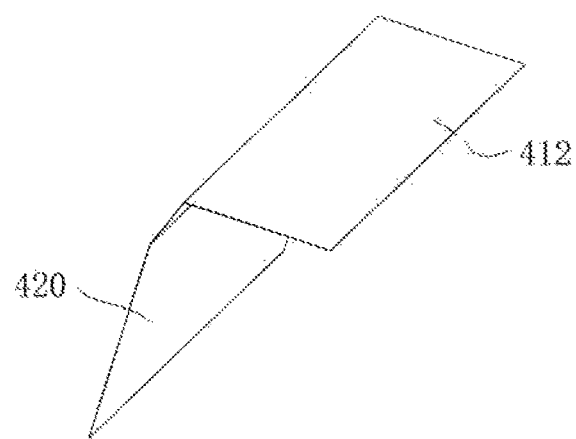
FIG. 9 shows a schematic view of a configuration of a second cover member matching with a side connecting body according to an embodiment of the present disclosure.
Figure 10:
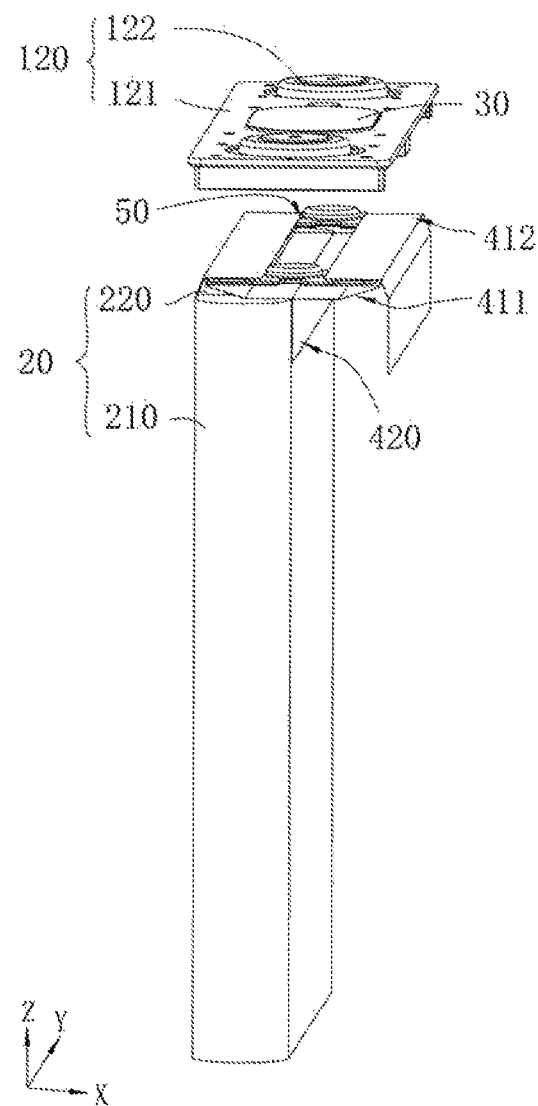
FIG. 10 shows a partial schematic view of a configuration of a secondary battery according to an embodiment of the present disclosure.

Please refer to FIG. 7 to FIG. 10 together. FIG. 7 shows a schematic diagram of a configuration of an insulating member 40 according to an embodiment of the present disclosure, FIG. 8 shows a schematic diagram of a configuration of a first cover member 411 matching with a side connecting body 420 according to an embodiment of the present disclosure, FIG. 9 shows a schematic diagram of a configuration of a second cover member 412 matching with a side connecting body 420 according to an embodiment of the present disclosure, and FIG. 10 shows a partial schematic diagram of a configuration of a secondary battery 1 according to an embodiment of the present disclosure.

Alternatively, in order to better extend the diffusion path length of the free lithium ions, the main cover body 410 may include a first cover member 411 and a second cover member 412. The first surface 211 has a center line 212, which divides the first surface 211 into first and second regions 211a, 211b disposed opposite to each other, in the thickness direction X of the electrode assembly 20. The two tabs 220 are disposed in the first region 211a and bent in the thickness direction X toward the second region 211b. The first cover member 411 at least covers the second region 211b, and the second cover member 412 at least covers the first region 211a.

By defining the main cover body 410 to include the first cover member 411 and the second cover member 412, and making the corresponding cover member to cover the corresponding region where the cover member is located, not only a coverage requirement for the first surface 211 can be satisfied, but also the tab 220 extending out from the first surface 211 can be avoided, thereby better satisfying a direct or an indirect electrical connection requirement for the tab 220 and the electrode terminal 122.

As an alternative embodiment, the first cover member 411 and the second cover member 412 at least partially overlap in a height direction Z of the electrode assembly 20. By this configuration, it can be effectively prevented from forming a gap between the first cover member 411 and the second cover member 412, thereby satisfying a requirement of completely covering the first surface 211 on the main cover body, and further prolonging the time required to corrode through the vent 30.

In some alternative embodiments, the secondary battery 1 further includes connecting pieces 50. Two connecting pieces 50 arranged in pairs are located between the cap plate 121 and the electrode assembly 20, and each of the connecting pieces 50 includes a terminal connection portion 510 connected to the electrode terminal 122 and a tab connection portion 520 connected to the tab 220. By providing the connecting piece 50, the connection of the tab 220 and the electrode terminal 122 can be more facilitated. In a specific implementation, in the two electrode assemblies 20 disposed opposite to each other in the thickness direction X, the tabs 220 disposed opposite to each other may be connected to the tab connection portion 520 of the same connecting piece 50.

Optionally, the second cover member 412 further covers a surface of the tab connection portion 520 facing and close to the cap plate 121. Since the connecting piece 50 is made of a conductive material, when a short circuit occurs and the connecting piece 50 comes into contact with the electrolyte, free lithium ions are generated correspondingly. Therefore, by covering the tab connection portion 520 of the connecting piece 50 by use of the second cover member 412, the path length of the free lithium ions at the tab connection portion 520 to the vent 30 can be further extended, and the time required to corrode through the vent 30 can be prolonged.

As an alternative embodiment, in a length direction Y of the electrode assembly 20, a portion of the second cover member 412 located between the two connecting pieces 50 is connected to the first cover member 411. With the above configuration, the free lithium ions can be prevented from drifting to the vent 30 via the gap between the first cover member 411 and the second cover member 412. Further, by connecting the first cover member 411 and the second cover member 412 to each other, a connection strength of the first cover member 411 and the second cover member 412 to the main body 210 and the tab 220 of the electrode assembly 20 can be ensured, thereby better ensuring the extending of the path length of the lithium ions.

In some alternative embodiments, the tab 220 includes a fixing portion 221 and a bent portion 222. The fixing portion 221 extends in the thickness direction X and is fixedly connected to the tab connection portion 520. The bent portion 222 is connected between the fixing portion 221 and the main body 210, and is bent relative to the fixing portion 221. With the above configuration, a requirement on the connection among the tab 220, the main body 210 and the connecting piece 50 can be better satisfied.

Optionally, the first cover member 411 may include a first support portion 411a, a second support portion 411b, and a third support portion 411c. In the height direction Z of the electrode assembly 20, the first support portion 411a is disposed opposite to the fixing portion 221 of the tab 220 and covers a surface of the fixing portion 221 facing away from the cap plate 121, and the first support portion 411a and the second cover member 412 are stacked and connected to each other. The second support portion 411b covers the second region 211b, and the third support portion 411c is connected between the first support portion 411a and the second support portion 411b and covers a side of the bent portion 222 close to the second region 211b.

With the above configuration, the first cover member 411 not only can cover the second region 211b of the first surface 211 better, but also can cover at least a part of the fixing portion 221 and of the bent portion 222 of the tab 220, which can ensure the extending of the path length of the free lithium ions generated in various surfaces of the electrode assembly 20 close to or facing the vent 30, and also can improve a connection strength between the first cover member 411 and the electrode assembly 20.

Optionally, the first support portion 411a, the second support portion 411b, and the third support portion 411c of the first cover member 411 may be formed as an integral member, which can prevent generation of an abutting gap between any two of the support portions connected to each other, and also facilitate the manufacturing of the first cover member 411. Optionally, each of the first support portion 411a, the second support portion 411b, and the third support portion 411c of the first cover member 411 may be formed as a sheet-like member, and specifically, may be formed as a flexible sheet-like member, which can be applied to the coverage requirement for the electrode assembly 20 in various forms, and also can reduce an occupation space, thereby avoiding affection on the energy density of the secondary battery 1.

Optionally, the second cover member 412 may also be formed as a sheet-like member, and is disposed opposite to the first support portion 411a of the first cover member 411 in the height direction Z of the electrode assembly 20. By clamping of the first support portion 411a and the second cover member 412 on the fixing portion 221 of the tab 220 and the connecting piece 50, the coverage requirement for the tab 220 and the tab connection portion 520 of the connecting piece 50 can be better satisfied.

As an alternative embodiment, the insulating member 40 further includes a side connecting body 420. The main cover body 410 is connected with the side connecting body 420 on at least one side in the thickness direction X, and the side connecting body 420 is attached to a surface of the electrode assembly 20 in the thickness direction X. By providing the side connecting body 420 and defining its connection relationship with the main cover body 410 and the electrode assembly 20, the connection strength between the entire insulating member 40 and the electrode assembly 20 can be improved, and the main cover body 410 can be prevented from being separated from the electrode assembly 20 under immersion of the electrolyte, thereby ensuring the extending of the path length of the free lithium ions.

In some alternative embodiments, the main cover body 410 is provided with one side connecting body 420 on each side in the thickness direction X, wherein one side connecting body 420 is integrally formed with the first cover member 411, and specifically, may be connected to the second support portion 411b of the first cover member 411 and intersect with the second support portion 411b, and the other side connecting body 420 is integrally formed with the second cover member 412 and intersects with the second cover member 412. With the above configuration, the connection of the side connecting body 420 to the main cover body 410 can be facilitated.

Meanwhile, the side connecting body 420 connected to the first cover member 411 may be connected to one side surface of the electrode assembly 20 in the thickness direction X, and the side connecting body 420 connected to the second cover member 412 may be connected to the other side surface of the same electrode assembly 20 in the thickness direction X. With the above configuration, the connection strength between each of the first cover member 411 and the second cover member 412 and the electrode assembly 20 can be ensured, and the requirement of extending the path length of the free lithium ions can be better satisfied.

It can be understood that, the secondary battery 1 according to the above embodiments of the present disclosure is described by exemplarity including two electrode assemblies 20. It can be understood that, it is only one alternative embodiment. In some other examples, the secondary battery 1 may include more than two, for example, four, six or even more electrode assemblies 20, wherein each of the electrode assemblies 20 may be disposed corresponding to one main cover body 410, and the two electrode assemblies 20 of the same pair are disposed with the respective second regions 211b adjacent to each other. With the above configuration, not only the energy storage requirement on the secondary batteries 1 of different types can be satisfied, but also the coverage requirements for the respective electrode assemblies 20 can be satisfied, thereby satisfying a protection requirement for the vent 30 when a short circuit occurs inside the electrode assembly 20.

Of course, in some other examples, the secondary battery 1 may include only one electrode assembly 20, and the one electrode assembly 20 may also include an insulating member. In this case, the insulating member may include only one main cover body 410, as along as the protection requirement for the vent 30 when a short circuit occurs inside the electrode assembly 20 can be satisfied.

Figure 11:
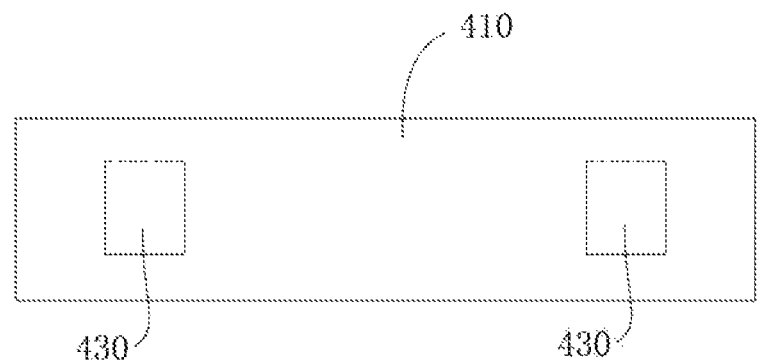
FIG. 11 shows a schematic view of a configuration of an insulating member according to another embodiment of the present disclosure.

Please refer to FIG. 11 together. FIG. 11 shows a schematic diagram a configuration of an insulating member 40 according to another embodiment of the present disclosure. It can be understood that, in the case that the vent 30 is disposed on the cap plate 121 and the tab 220 is located between the main body 210 and the cap plate 121, it is one alternative embodiment that the main cover body 410 adopts the configuration as described in the above embodiments. It can be understood that the main cover body 410 is not limited to the configuration including the first cover member 411 and the second cover member 412 as described in the above embodiments, and in some other examples, the main cover body 410 may be formed as an integral sheet-like member, and may cover the first surface 211 partially or completely.

For example, as shown in FIG. 11, the main cover body 410 may be formed as an integral member, and the main cover body 410 may be cut at a position corresponding to the tab 220 such that a cut member 430 may be opened from a side of the electrode assembly 20 in the thickness direction X, and attached to a surface of the tab 220 facing the vent 30. As such, not only the coverage requirement for the first surface 211 can be satisfied, but also the direct or indirect electrical connection of the tab 220 to the electrode terminal 122 on the cap plate 121 can be facilitated.

Figure 12:
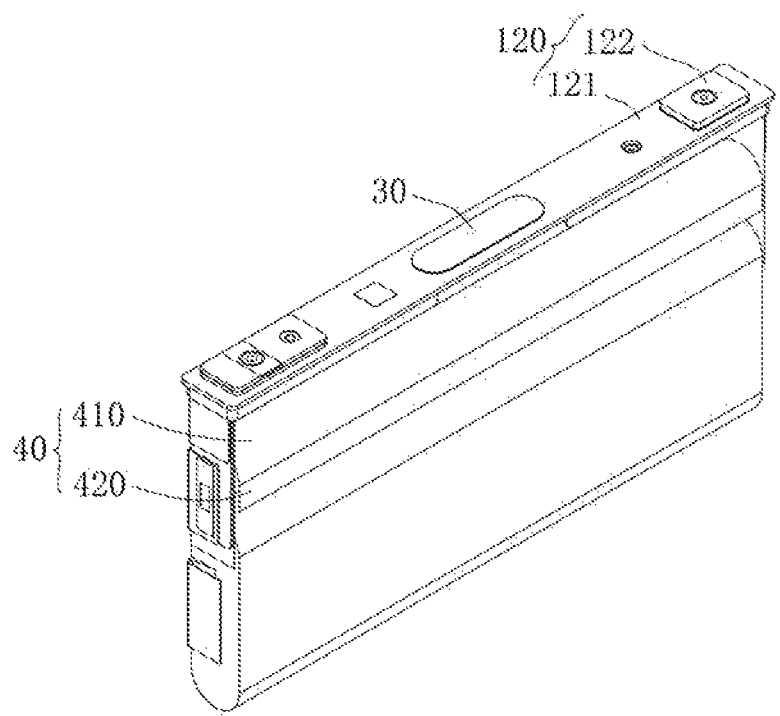
FIG. 12 shows a schematic exploded view of a configuration of a secondary battery according to another embodiment of the present disclosure.
Figure 13:
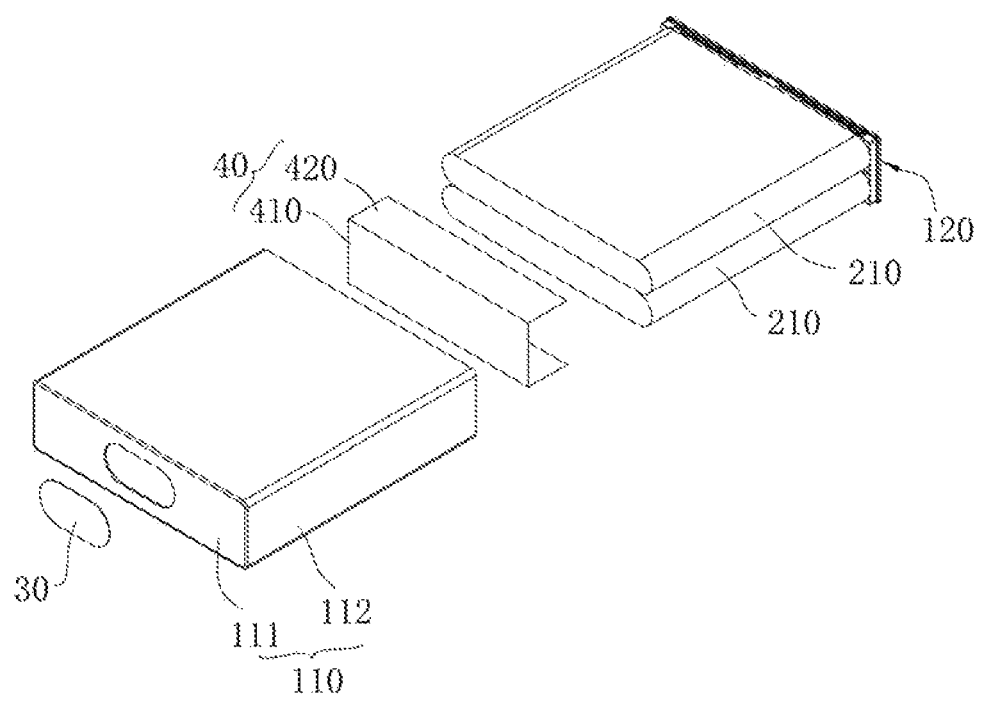
FIG. 13 shows a schematic exploded view of a configuration of a secondary battery according to still another embodiment of the present disclosure.
Figure 13:
Figure 14:
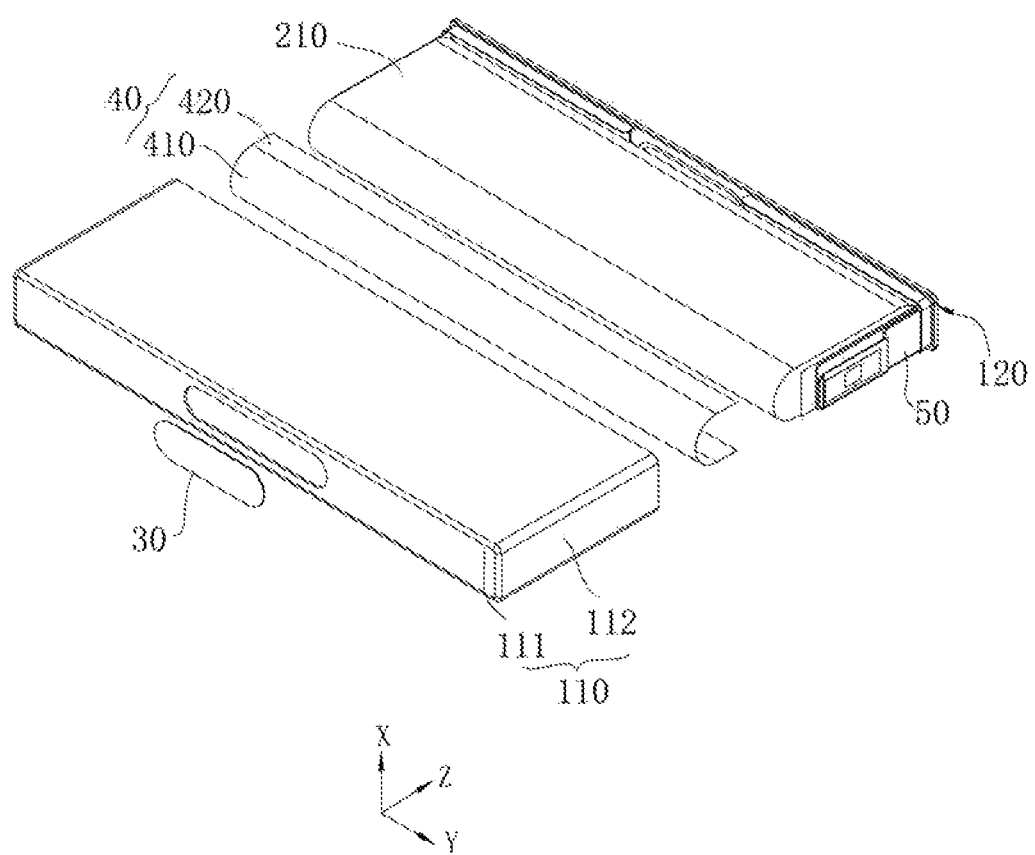
FIG. 14 shows a schematic exploded view of a configuration of a secondary battery according to still another embodiment of the present disclosure.

Please referring to FIG. 12 to FIG. 14 together. FIG. 12 shows a schematic exploded view of a configuration of a secondary battery 1 according to another embodiment of the present disclosure, FIG. 13 shows a schematic exploded view of a configuration of a secondary battery 1 according to still another embodiment of the present disclosure, and FIG. 14 shows a schematic partial view of a configuration of a secondary battery 1 according to a still another embodiment of the present disclosure.

It can be understood that the secondary battery 1 mentioned in the above embodiments is exemplarily illustrated by disposing the vent 30 on the cap plate 121 and locating the tab 220 between the cap plate 121 and the main body 210. In some other examples, as shown in FIG. 12, the vent 30 may be disposed on the cap plate 121, while the tab 220 may be led out from a side of the main body 210 instead of the first surface 211, which can also satisfy the protection requirement. Further, the main cover body 410 of the insulating member 40 may be disposed between the main body 210 and the cap plate 121, and may be formed as an arc sheet-like member matching with a shape of the first surface 211. This also can satisfy the energy storage requirement of the secondary battery and prolong the service life of the secondary battery.

As shown in FIG. 13 and FIG. 14, the vent 30 is not limited to be disposed on the cap plate 121, and the vent 30 may be disposed on the bottom plate 111 of the case 110. In this case, the first surface 211 of the main body 210 may be a surface facing the bottom plate 111 of the case 110, and the main cover body 410 of the insulating member 40 may be disposed between the main body 210 and the bottom plate 111. Moreover, the main cover body 410 may be formed as a flat sheet-like member, for example, a flat sheet-like member as shown in FIG. 13, or may be an arc sheet-like member as shown in FIG. 14. Meanwhile, the tab 220 of the electrode assembly 20 may be led out from the first surface 211, and may be led out from other surfaces, for example, led out from both sides of the main body 210 in the length direction Y of the electrode assembly 20, as long as the energy storage requirement of the secondary battery 1 can be satisfied, and the time required to corrode through the vent 30 when a short circuit occurs inside the electrode assembly 20 can be prolonged.

In some other examples, the vent 30 may be disposed on the sidewall 112 of the case 110, and specifically, may be located on one of wall surfaces of the sidewall 112 in the length direction Y. In this case, a surface of the main body 210 facing a position where the vent is located, serves as the first surface 211, which also can satisfy the requirement on the energy storage and long service life of the secondary battery 1, and the details will not be listed here.

In a specific implementation, in the secondary battery of the embodiments as shown in FIG. 11 to FIG. 14, the main cover body 410 of the insulating member 40 may further be provided with the side connecting body 420 in the thickness direction X, which functions the same as the above embodiments, and the details will not be described here.

In summary, the secondary battery 1 according to the embodiments of the present disclosure includes the outer casing 10, the electrode assembly 20, the vent 30, and the insulating member 40, and thus not only can satisfy the energy storage requirement, but also can release pressure via the vent 30 when an internal pressure of the secondary battery 1 is too large by providing the vent 30, thereby ensuring the safety of the secondary battery 1. Further, by correspondingly providing the insulating member 40, and defining the insulating member 40 to be at least partially disposed between the electrode assembly 20 and the vent 30 and at least partially cover the projection of the vent 30 on the main body 210 of the electrode assembly 20, when a short circuit occurs inside the electrode assembly 20, the free lithium ions inside the electrode assembly 20 can only diffuse along a periphery of the insulating member 40, while cannot directly diffuse to the vent 30. That is, the path length for the lithium ions to diffuse from the electrode assembly 20 to the vent 30 is greatly extended, which can prolong the time required to corrode through the vent 30 and cause leakage of the electrolyte, and further prolong the service life of the secondary battery 1.

The battery pack 100 according to an embodiment of the present disclosure includes the battery module 102, which includes the secondary battery according to any of the above embodiments, and thus can satisfy the energy storage requirement, has a higher safety level and a longer service life, and thus is easy to be promoted.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A secondary battery, comprising:
an outer casing, comprising a case and a cap assembly connected to each other, the case is provided with an opening, the cap assembly comprises a cap plate and an electrode terminal connected to the cap plate, wherein the cap plate is adapted to cover the opening;
an electrode assembly accommodated in the case and comprising a main body and a tab extending out from the main body, wherein the tab is electrically connected to the electrode terminal;
a vent connected to the outer casing; and
an insulating member at least partially disposed between the electrode assembly and the vent,
wherein a projection of the vent on the main body is at least partially covered by the insulating member,
the main body has a first surface facing the vent, and the insulating member comprises a main cover body covering at least a portion of the first surface,
the vent is disposed on the cap plate, and the electrode assembly comprises two tabs, each of which extends from the first surface toward the cap plate,
the main cover body comprises a first cover member and a second cover member, the first surface has a center line dividing the first surface into a first region and a second region disposed opposite to each other in a thickness direction of the electrode assembly, the two tabs are disposed in the first region and bent toward the second region in the thickness direction, the first cover member is adapted to at least cover the second region, and the second cover member is adapted to at least cover the first region,
the secondary battery further comprises connecting pieces, two connecting pieces in pairs are located between the cap plate and the electrode assembly, each of the connecting pieces comprises a terminal connection portion connected to the electrode terminal and a tab connection portion connected to the tab, the second cover member is further adapted to cover a surface of the tab connection portion facing the cap plate, and a portion of the second cover member located between the two connecting pieces in a length direction of the electrode assembly is connected to the first cover member,
the tab and tab connecting portion are positioned between the first cover member and the second cover member, wherein the first cover member is positioned on a side away from the cap plate covering the tab and the tab connection portion, and the second cover member is positioned on a side close to the cap plate covering the tab and the tab connection portion, and
the first cover member is attached to an entire surface of the second region.

2. The secondary battery according to claim 1, wherein the second cover member is configured to at least partially overlie the first cover member in a height direction of the electrode assembly.

3. The secondary battery according to claim 1, wherein the tab comprises a fixing portion extending in the thickness direction and fixedly connected to the tab connection portion, and a bent portion connected between the fixing portion and the main body and bent relative to the fixing portion, wherein the first cover member comprises a first support portion, a second support portion and a third support portion; and
in the height direction, the first support portion is disposed opposite to the fixing portion and adapted to cover a surface of the fixing portion facing away from the cap plate, and is stacked and connected to the second cover member, the second support portion is adapted to cover the second region, and the third support portion is connected between the first support portion and the second support portion and adapted to cover a side of the bent portion close to the second region.

4. The secondary battery according to claim 1, wherein the insulating member further comprises a side connecting body, wherein the main cover body is connected with the side connecting body on at least one side in the thickness direction, and the side connecting body is attached to a surface of the electrode assembly in the thickness direction.

5. The secondary battery according to claim 4, wherein the main cover body is provided with one side connecting body on each side in the thickness direction, and one of the side connecting bodies is integrally formed with the first cover member, and the other of the side connecting bodies is integrally formed with the second cover member.

6. The secondary battery according to claim 1, wherein the secondary battery comprises a plurality of electrode assemblies, which are arranged in pairs and stacked in the thickness direction, wherein each of the electrode assemblies is disposed corresponding to one main cover body, and the second regions of the two electrode assemblies of the same pair are disposed adjacent to each other.

7. The secondary battery according to claim 1, wherein the case comprises a bottom plate which is disposed opposite to the cap plate and a sidewall which surrounds the bottom plate and is connected to the bottom plate and the cap plate, wherein the opening is formed by one end of the sidewall away from the bottom plate.

8. The secondary battery according to claim 1, wherein the insulating member is formed as a flexible sheet-like member, and the insulating member is adhesively connected to the electrode assembly.

9. A battery pack, comprising:
a housing having a receiving chamber; and
a battery module disposed in the receiving chamber, wherein the battery module comprises a plurality of secondary batteries according to claim 1.

* * * * *